United States Patent [19]
Sharer

[11] Patent Number: 5,497,949
[45] Date of Patent: Mar. 12, 1996

[54] APPARATUS FOR RECLAIMING WASTE CARPETING

[75] Inventor: Paul C. Sharer, Greenville, S.C.

[73] Assignee: JPS Automotive Products Corp., Greenville, S.C.

[21] Appl. No.: 268,296

[22] Filed: Jun. 30, 1994

[51] Int. Cl.$^6$ .......................... B02C 21/00; B02C 23/10; B02C 23/14

[52] U.S. Cl. ................. 241/76; 241/77; 241/78; 241/79.1; 241/152.2; 241/DIG. 38; 156/94

[58] Field of Search ............................. 156/94, 344, 584; 241/14, 76, 77, 78, 79.1, 81, 101.4, DIG. 31, 152.1, 152.2, 157–160, 165.5, 235, DIG. 38

[56] References Cited

U.S. PATENT DOCUMENTS

| | | | |
|---|---|---|---|
| 1,484,208 | 2/1924 | Davis | 241/4 |
| 2,471,043 | 5/1949 | Schenck | 241/14 |
| 3,364,526 | 1/1968 | Varady et al. | 19/82 |
| 3,843,060 | 10/1974 | Colburn | 241/24 |
| 3,923,256 | 12/1975 | Dörner | 241/76 |
| 3,981,455 | 9/1976 | Kaczmarek | 241/152.2 X |
| 4,145,007 | 3/1979 | Jetzer | 241/152.2 X |
| 4,363,450 | 12/1982 | Schmidt | 241/79.1 X |
| 4,483,488 | 11/1984 | Luff et al. | 241/24 X |
| 5,230,473 | 7/1993 | Hagguist et al. | 241/3 |

Primary Examiner—Timothy V. Eley
Attorney, Agent, or Firm—Henry S. Jaudon; Cort Flint

[57] ABSTRACT

A system for separating and packaging carpet forming fibrous material and backing material from carpet pieces for recycling. The system comprises a shredding apparatus for separating carpet pieces into substantially even sized small pieces of between two inches by two inches and four inches by four inches. These pieces are passed to a granulating apparatus which slices them into smaller pieces of between one-quarter inch and one-half inch which causes the fibrous material and backing material to begin to separate. A surge apparatus receives the partially separated materials and delivers them in an even manner to an elutriator. The elutriator using an upper air delivery system for carrying off the fibrous material and a lower air delivery system for carrying off the backing material delivers the separated materials to storage apparatus which readies the separated materials for recycling.

13 Claims, 2 Drawing Sheets

APPARATUS FOR RECLAIMING WASTE CARPETING

BACKGROUND OF THE INVENTION

This invention is directed to a system and method for reclaiming components of pile carpet for recycling. Basically, carpets comprise fibrous materials and backing materials. The present system separates and prepares these materials for reintroduction into carpeting as a forming component.

It has become increasingly necessary to generate as little waste as possible while manufacturing commercial products. This is because of increased emphasis on maintaining a clean environment and also because of the more stringent regulations placed on landfill operations. In order to comply environmentally and at the same time lower the cost of doing business, it is now most desirable to recycle as much waste product as possible.

There have been several efforts in the past to provide systems which separate carpeting into its base components for reuse such as the arrangement taught in the U.S. Pat. No. 5,230,473. This system maintains the backing fabric in tact while acting to separate the bonding materials, the backing materials, and the pile materials. This system is both too expensive and error prone to be practical. There are also known systems for recovering the forming components of old automobile tires such as those described in U.S. Pat. Nos. 2,471,043; 3,364,526; and 3,923,256. These systems were developed primarily because of the problem and expense of disposing of old discarded tires. They do not include disclosure directed to reclaiming carpet forming components.

Accordingly, an object of this invention is to assist in maintaining a clean environment by recycling manufacturing waste created by carpet scraps and seconds.

It is another object of the invention to separate carpet forming components for reintroduction as a component in the manufacture of carpeting.

It is another object of the invention to improve cost effectiveness in the production of pile carpeting.

It is yet another object of the invention to improve the quality of the secondary backing material used in carpet manufacturing while at the same time reducing the cost of that material.

SUMMARY OF THE INVENTION

The above objectives are accomplished according to the invention by providing a system for disintegrating waste carpeting, particularly moldable or molded automotive carpeting, separating its forming materials and recycling these materials. Carpet forming materials comprise fibrous materials and backing materials. The system includes a shredding apparatus comprising high torque, low speed, oppositely rotating grinding wheels which shred the carpet into uniform small pieces. The small pieces are transported from the shredding apparatus to a granulator apparatus which comprises high speed cutting rolls which slice the small pieces into fine pieces and which also begin the separation of the forming materials. These fine pieces, along with the separated materials, are transported to a separating apparatus which further separates loose ones of the fibrous material from the backing material. The separated fiber and backing materials are transported to fiber storage apparatus and backing material storage apparatus.

Delivery apparatus is connected with at least one of the fiber storage apparatus and the backing material storage apparatus. This delivery apparatus acts to deliver measured amounts of at least one of these materials directly into recycling providing that at least a portion of the waste carpeting is reintroduced into new carpeting.

The waste carpeting is preferably virgin carpet and comprises carpet scraps and carpet seconds. The backing material includes a primary backing and a secondary backing with the primary backing consisting of pure or unfilled thermoplastic material such as ethylene vinyl acetate or polyethylene and the secondary backing consisting of a moldable thermoplastic such as ethylene vinyl acetate or polyethylene and a mineral filler such as calcium carbonate or barium sulphate.

The separator apparatus comprises an elutriator which has a vertical air stream which allows the backing material to fall by gravity onto a conveyor and which entrains and draws the fibrous material off vertically through a separate conduit. There is a surge bin disposed between the granulator apparatus and the separating apparatus which acts to evenly deliver the small pieces to the separating apparatus.

There may be a second granulator apparatus and a second separating apparatus arranged between the first separating apparatus and the backing material collecting apparatus. These second apparatus act to further slice the small pieces of carpeting material to cause a more complete liberation of the fibrous materials and the backing materials. A second elutriator acts to again separate the backing material and the fibrous material and a second conveyor apparatus connects with and delivers the separated fibers from the second separating apparatus to the fiber material storage apparatus.

The conveyor arranged between the shredder and the first granulator comprises an inclined conveyor while the conveyors between the granulators and the separating apparatus comprise air ducts.

The fibrous material storage apparatus may be connected with a baling apparatus, which bales the fibrous material for future recycling. No more than ten percent of the backing material is retained by the fibrous material delivered from the fibrous material storage apparatus to the baling apparatus.

The backing material storage apparatus is preferably connected with a virgin feed stream of granulated moldable backing material which is being supplied to apparatus applying a secondary backing to newly manufactured carpeting. The reclaimed backing material is delivered in measured amounts into the feed stream where it integrates with the virgin backing material and is recycled onto new carpeting as secondary backing.

The invention includes a method of recycling carpet forming components, comprised of backing material and fibrous material. The method includes the steps of collecting carpet scraps and carpet seconds; of shredding and granulating these scraps and seconds to separate the fibrous material from the backing material; of collecting the separated fibrous material and backing material into separate facilities; and of delivering the separated backing materials from the collection facility directly into a molding backing operation.

DESCRIPTION OF THE DRAWINGS

The invention will be more readily understood from a reading of the following specification and by reference to the accompanying drawing forming a part thereof, wherein.

DESCRIPTION OF A PREFERRED EMBODIMENT

Figure 1:
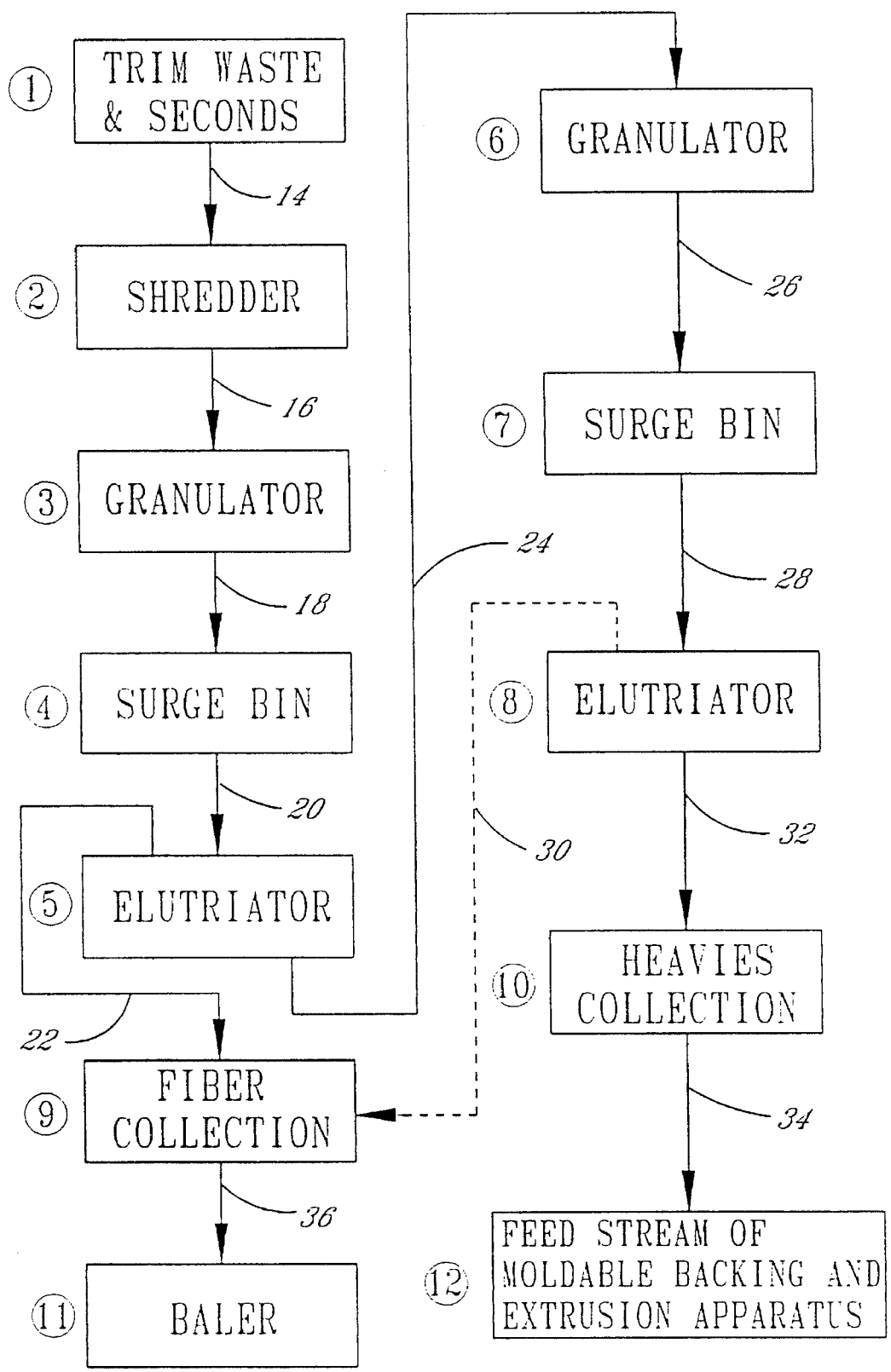
FIG. 1 is a flow chart for the recycling system of the invention.

Referring now to the drawing, the invention will be described in more detail.

The system developed for separating carpet forming components for recycling is particularly suited for separating virgin carpeting consisting of carpet scraps and carpet seconds which are acquired during the finishing operations for molded automobile carpeting. The operation for manufacturing molded automobile carpeting includes producing a base carpet having pile yarns projecting from a backing fabric. The pile yarns and generally the backing fabric are formed of fibrous material. A thermoplastic primary backing of preferably ethylene vinyl acetate or polyethylene is applied to stabilize the base carpet. A secondary backing of moldable thermoplastic material such as filled ethylene vinyl acetate or polyethylene is then applied over the primary backing. The finished carpeting is cut into standard sizes and placed into molds which shape it to conform with the interior of a vehicle. Excess carpeting around the edges of the mold is trimmed away as the carpet is molded to the desired shape. Any carpet piece containing a defect is also discarded. These defective pieces of carpeting along with the trim waste constitute the virgin or unused carpet material for which the instant system was developed to separate into its basic forming components.

Figure 2:
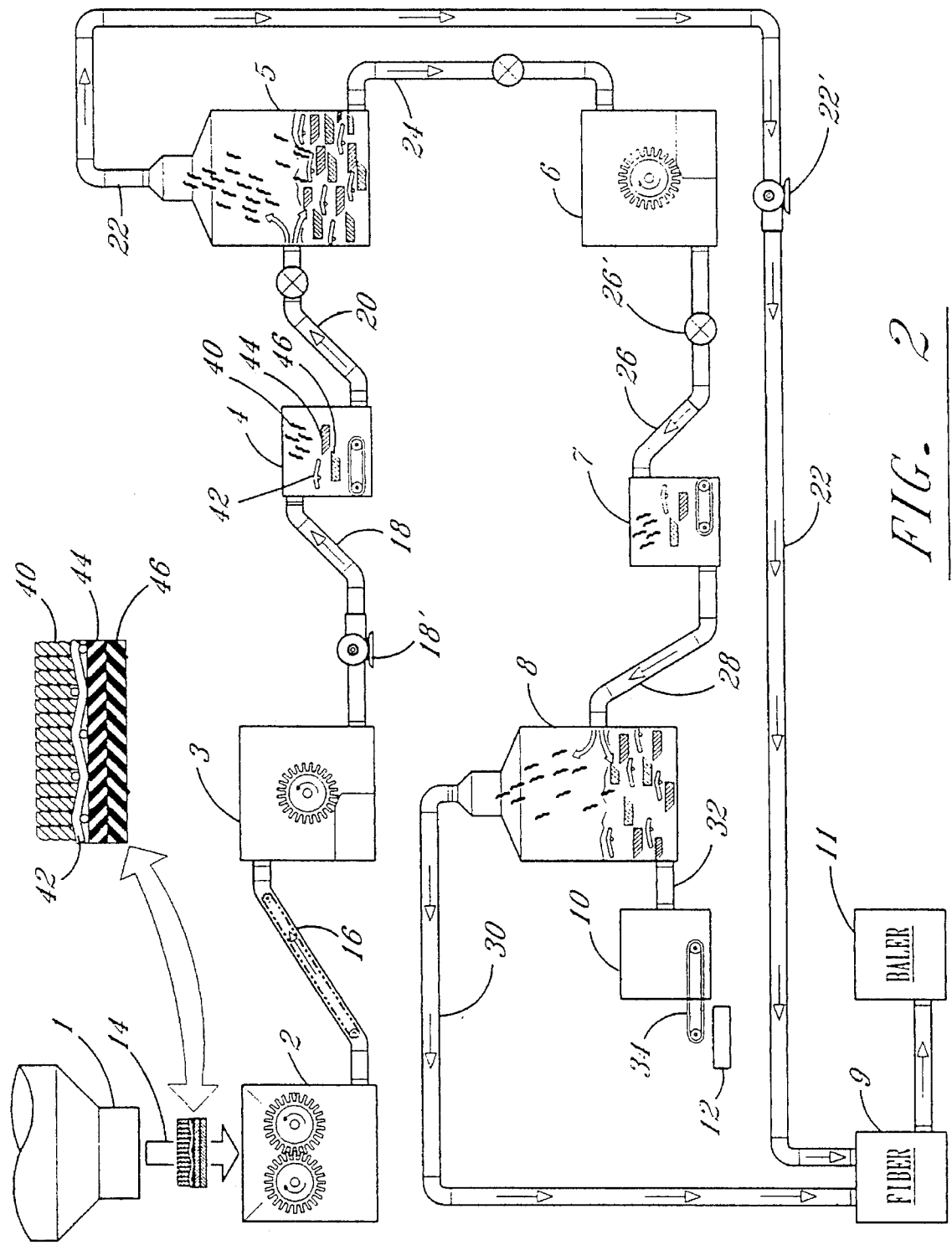
FIG. 2 is a schematic of the recycling system of the invention.

Generally automotive carpeting, as shown in FIG. 2, consist of a nylon face layer or pile 40; a backing fabric 42 produced by weaving, air entangling, or needling polyester, polypropylene or nylon filaments; primary backing 44 formed as a coating of pure or unfilled thermoplastic material such as ethylene vinyl acetate or polyethylene; and a thermoplastic moldable secondary backing 46 preferably of the same material as the primary backing filled with a mineral filler such as calcium carbonate or barium sulphate. It is noted at this point backing fabric 42 may consist of a plastic film, in which instance it would be considered to be a backing material. It is further noted that the instant separating system is not limited to virgin carpeting nor is it limited to use with the particular carpet forming materials listed above. The recycling operation does however require a high degree of purity and compatible forming materials.

Turning now to FIGS. 1 and 2, there is shown a plurality of sequentially arranged stations between which the carpet material passes during the separating process. Station 1 comprises a collecting apparatus or bin into which the carpet scraps and seconds are placed. The collection station is capable of handling carpet pieces of up to 100" by 100" although most pieces will be much smaller. The pieces of discarded carpeting are passed in a continuous manner from collection station 1 by means of a belt or a gravity feed identified as 14 into shredding station 2.

Shredding station 2 includes a shredder or shredding apparatus which acts to tear, cut and generally reduce the carpet material into substantially uniform pieces of approximately 2"×2". The shredding apparatus comprises a pair of oppositely rotating toothed wheels which are driven with high torque at low RPM. Generally the shredding apparatus has a horsepower of between 10 and 50 and is driven at between 10 and 60 RPM's. Suitable shredding apparatus is available from the Shred Tech Co. of Spartenburg, S.C.

An inclined conveyor 16 receives the carpet pieces from shredding station 2 and delivers them to granulator station or apparatus 3. This station comprises a granulator which includes a high speed cutter which further reduces the size of the material to between ¼" and ½" pieces. The action of the granulator 3 also begins to liberate the fiber material from the backing material. The high speed cutter consists of a single rotating member having a plurality of cutting blades extending outwardly therefrom. The cutting blades are designed to rotate at between 600 and 1500 RPM's. A grinder such as Model X-1000 manufactured by the Cumberland Company of Providence, R.I. is preferred at station 3.

The granulated material is removed from granulator station 3 by means of an air conveyor or by air being forced through an air duct as is indicated at 18. Air conveyor 18 connects with a surge station or surge bin 4. Any suitable pneumatic conveyor system with one or more blowers shown at 18' may be used.

Surge bin 4, which receives the granulated material from granulator apparatus 3 in somewhat of an uneven or non-uniform manner, acts to stabilize the flow of the carpet forming materials to a separator apparatus or an elutriator apparatus 5. Here the fiber material 40,42 and the backing material 44,46 which are now substantially disengaged are separated from each other. Elutriator 5 includes conduits which direct a vertical air stream through the device. This vertical air stream is of sufficient velocity to entrain the disengaged fibers 40, 42 and transport them upwardly through the elutriator and out through a conduit or air duct 22. The backing material 44, 46, which is considerably heavier than the fibers, drops to the bottom of elutriator 5 where they are picked up by an air conveyor 24 and transported to a second granulator station or granulator apparatus 6. Blower 22' moves the air through conveyor or duct 22 with sufficient velocity to evacuate the liberated fiber material from the elutriator apparatus 5 and deliver them to a fiber collection station or apparatus 9.

Second granulator apparatus 6, which is preferably Model B-50 of the Cumberland Co, operates substantially as does granulator apparatus 3 and again cuts the small pieces of backing material into smaller pieces and further separates remaining fiber material therefrom. An air conveyor 26 picks up and conveys the further granulated and separated fiber and backing material from second granulator 6 and transports it to a second surge bin 7. Air control valves such as at 26' may be incorporated with conveyor 26 to control the air flow as desired. Again the surge bin acts to deliver the further granulated material at a substantially constant rate to a second separating apparatus or elutriator 8.

The second elutriator, which is similar to elutriator 5, also includes a vertical air stream of sufficient veracity to pick up and transport all remaining separated fiber material. This fiber material is transported through high veracity air duct 30 back to fiber collection apparatus 9.

Again, the heavier backing material drops to the bottom of elutriator 8 and is picked up and transported by an air conveyor 32 to heavy collectibles bin or station 10.

Should it be determined that the desired purity of either the collected backing material or fiber material has not been obtained, an additional elutriator may be incorporated in the system between stations 8, 9, and 10. This additional system would function similarly to system 8.

Heavy collection bin 10 functions as a surge unit for the introduction of the collected heavy backing material in an even and controlled manner into feed system 34 which delivers the backing material directly into the feed stream of virgin secondary backing material indicated at station 12. Because the surge unit of heavy collection bin 10 feeds the reclaimed backing material in an even manner and in prescribed volume into the feed stream the percentage of recycled material absorbed and integrated with the virgin secondary backing material is controlled providing for a uniform backing product. The integrated backing material is then applied to newly produced carpeting as the secondary backing. The reclaimed material may comprise as little as 5% and as much as 50% of the extrusion material forming the secondary backing, the selected percentage depending on the requirements of the finished product.

It is noted that while the virgin backing material comprises only filled and moldable thermoplastic, the reclaimed backing material comprises both filled and unfilled moldable thermoplastic. The latter of these backing materials, which have been reclaimed from primary backing material, are of a higher quality than the filled moldable thermoplastic material. Consequently, the recycling operation or the introduction of the reclaimed backing material with the virgin secondary backing material actually produces a higher quality product for use as the secondary backing than would otherwise be had.

A mechanical conveyor 36 withdraws the collected fibers material from collection apparatus 9 at an even and uniform rate and delivers them into a baling apparatus 11. Here the fiber material is baled and prepared for recycling at a later time. The fiber material collected in fiber collecting apparatus 9 and subsequently baled contains no more than 10% of the backing material.

Each of the conveying devices utilized in the system may be any of a number of well known mechanical and/or pneumatic conveyor systems which are commercially available, and whose choice is well within the preview of the average artisan. The apparatus used at stations 1, 4, 5, 7–12 is also commercially available and form no part of the invention. The surge bins apparatus and elutriators of stations 1, 4, 5, 7, 8, and 10 may be conventional apparatus manufactured by Sterling Systems of Forest, Va. The heavy collection bin for station 10 may be that manufactured by Ensign Equipment Inc. of Holland, Mich. and the fiber collection and baling apparatus of stations 9 and 11 may be conventional balers manufactured by International Baler Corp of Jacksonville, Fla. Other suitable apparatus which would adequately separate the carpet forming materials may also be selected and utilized having been taught the principles and advantages of the present invention.

While a preferred embodiment of the invention has been described using specific terms, such description is for illustrative purposes only, and it is to be understood that changes and variations may be made without departing from the spirit or scope of the following claims.

What is claimed is:

1. A carpet reclamation system for separating and recycling components of waste carpet, said carpet components comprising fibrous materials and backing materials, said system comprising:

a shredder for shedding said carpet into uniform small carpet pieces;

a granulator for grinding said small carpet pieces into fine carpet pieces;

a separator for separating loose ones of said fibrous material from said backing material;

a fiber storage unit for receiving said separated loose fibers;

a backing material storage unit for receiving said backing material;

conveyors connecting said shredder with said granulator, said granulator with said separator, said separator with said fiber storage unit, and said backing material storage unit; and a delivery apparatus connected with at least one of said fiber storage unit and said backing material storage unit, said delivery apparatus delivering measured amounts of one of said separated fibers and backing material into recycling;

whereby at least a portion of said waste carpet is reintroduced into new carpeting.

2. The system of claim 1 wherein said separator apparatus comprises an elutriator which includes a vertical air stream which entrains the fibrous material to be drawn vertically and which allows the backing material to fall by gravity.

3. The system of claim 1 including a surge bin disposed between said granulator and said separator, said surge bin acting to evenly deliver said small pieces to said separator.

4. The system of claim 1 including a second granulator and a second separator arranged between said separator and said backing material storage unit whereby said backing material is again ground which further liberates said fibrous material.

5. The system of claim 4 wherein said second separator comprises an elutriator.

6. The system of claim 4 wherein a second conveyor connects said second separator with said fiber material storage.

7. The system of claim 1 including a fiber baler, said delivery apparatus delivers said fibrous material from said fibrous material storage unit to said fiber baler for baling and subsequent use.

8. The system of claim 1 including a virgin feed stream of moldable backing material, said delivery apparatus delivering measured amounts of said backing material from said backing material storage unit directly into said virgin feed stream.

9. The system of claim 1 wherein said shredder comprises high torque low speed oppositely rotating grinding rolls.

10. The system of claim 1 wherein said granulator comprises high speed cutting rolls.

11. The system of claim 1 wherein said conveyor connecting said shredding apparatus and said granulator apparatus comprises an inclined conveyor.

12. The system of claim 1 wherein said conveyor connecting said granulator apparatus and said separating apparatus includes a pneumatic system having an air duct.

13. Apparatus for separating and recycling carpet components from carpet, said carpet components comprising fibrous material and backing material, said apparatus comprising:

a shredder for shedding said carpet pieces into substantially even sized small pieces of between two inches by two inches and four inches by four inches;

a granulator for grinding said small pieces into smaller pieces of between one-quarter inch and one-half inch causing said fibrous material and backing material to separate;

a surge bin for receiving said separated materials and for delivering said materials evenly to an elutriator;

said elutriator including an upper air delivery system and a lower air delivery system, said upper air delivery system acting to entrain and carry off said separated fibrous material while said lower air delivery system acts to receive and carry off said backing material;

baling apparatus for receiving said fibrous material; and extrusion apparatus for receiving said backing material;

whereby said carpet forming materials are separated and independently recycled.

* * * * *